United States Patent [19]

Young et al.

[11] Patent Number: 5,291,407
[45] Date of Patent: Mar. 1, 1994

[54] DRAFT CONTROL SYSTEM WITH SAFETY DISCONNECT

[75] Inventors: Steven C. Young, Lancaster; Bradley A. Nielsen; David G. Sokol, both of New Holland; Richard P. Strosser, Akron, all of Pa.

[73] Assignee: Ford New Holland, Inc., New Holland, Pa.

[21] Appl. No.: 709,236

[22] Filed: Jun. 3, 1991

[51] Int. Cl.$^5$ .................. G06F 7/70; G06F 15/48; A01B 63/112
[52] U.S. Cl. .................. 364/424.07; 364/424.05; 172/7
[58] Field of Search .................. 364/424.07, 424.01, 364/424.05, 424.1; 172/7, 2, 10; 91/361

[56] References Cited

U.S. PATENT DOCUMENTS

| | | | |
|---|---|---|---|
| 3,909,075 | 9/1975 | Pittet, Jr. et al. | 303/24 |
| 4,132,273 | 1/1979 | Mortonson et al. | 172/7 |
| 4,466,510 | 8/1984 | Sollog | 187/29 |
| 4,508,176 | 4/1985 | Wiegardt et al. | 172/7 |
| 4,518,044 | 5/1985 | Wiegardt et al. | 172/7 |
| 4,715,012 | 12/1987 | Mueller, Jr. | 364/900 |
| 4,817,499 | 4/1989 | Bellanger et al. | 91/361 |
| 4,837,691 | 6/1989 | Boe et al. | 364/424.05 |
| 4,846,283 | 7/1989 | Batcheller | 172/10 |
| 4,934,727 | 6/1990 | Hawkins et al. | 280/432 |
| 4,969,527 | 11/1990 | Boe et al. | 172/7 |

OTHER PUBLICATIONS

SAE Technical Paper 901561 entitled Development of the Electronic Draft Control System for the Ford New Holland 8210 Tractor.

*Primary Examiner*—Thomas G. Black
*Assistant Examiner*—Jacques H. Louis-Jacques
*Attorney, Agent, or Firm*—Griffin Butler Whisenhunt & Kurtossy

[57] ABSTRACT

In an automatic hitch control system wherein a hitch is raised or lowered in response to operation of a valve, and the valve is controlled by solenoids which are selectively energized by connecting them to ground through switch drivers, a safety disconnect relay is provided for preventing uncommanded motion of the hitch such as might occur if the lead between a solenoid and its driver should be grounded or if the driver should fail in an "on" state. The relay has contacts connected between the solenoids and the positive voltage for operating them. A microprocessor senses hitch position, the position of a quadrant lever and the speed of the tractor carrying the hitch. From the conditions sensed, the microprocessor determines if the tractor is moving, if the hitch is captured, if the hitch is moving and whether the hitch control system is in an open-loop control mode in which manual switches may be used to control hitch movement. If the hitch is not captured, or the hitch control system is in the open-loop mode, and uncommanded downward hitch motion is detected, the microprocessor energizes the safety disconnect relay to disable the hitch valve thereby preventing uncommanded downward motion of the hitch. When the hitch is captured and the control system is in a closed-loop control mode, feedback signals from the hitch act through a closed-loop to maintain the hitch at the position specified by the quadrant lever.

11 Claims, 6 Drawing Sheets

| FIG. 4A | FIG. 4B |

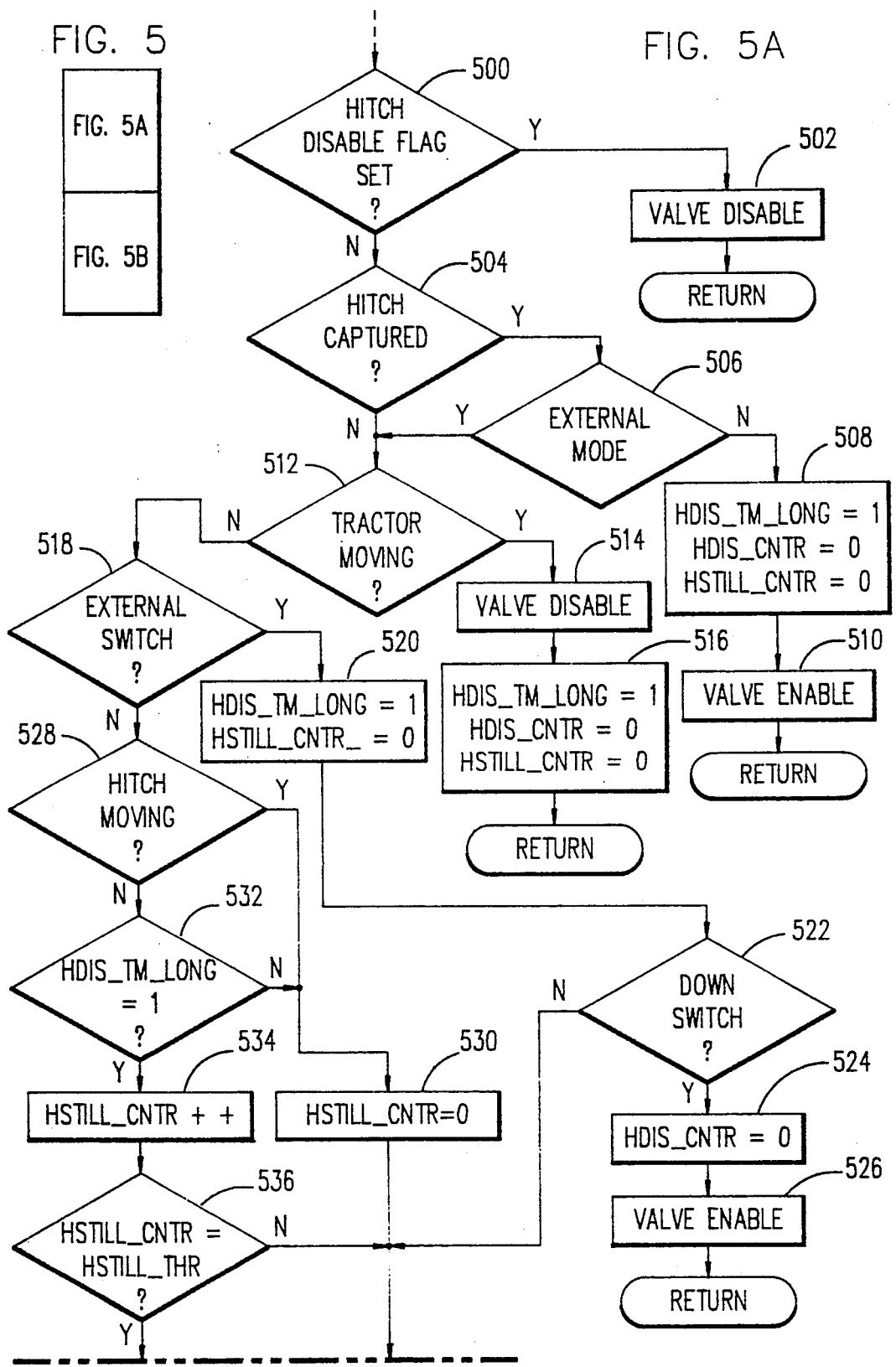

DRAFT CONTROL SYSTEM WITH SAFETY DISCONNECT

RELATED APPLICATIONS

This application is related to the following commonly owned and concurrently filed applications, the disclosures of which are incorporated herein by reference.

Application Ser. No. 07/709,185 for Draft Control System With Dual Mode Draft Sensitivity Application Ser. No. 07/709,237 for Wheel Speed Calibration and Slip Override Disable Application Ser. No. 07/709,184, now abandoned, for Draft Control System With Closed-loop Drop/Raise Rate Control

FIELD OF THE INVENTION

The present invention relates to an automatic draft control system for controlling the positioning of a hitch to which an implement, such as a plow, is attached. More particularly, this invention relates to improvements in electronic draft control systems of the type disclosed by Macqueene et al. in SAE Technical Paper No. 901561 entitled Development of the Electronic Draft Control System for the Ford New Holland 8210 Tractor.

BACKGROUND OF THE INVENTION

The aforementioned technical paper describes a microprocessor-based automatic draft control system for a three-point hitch. A tillage implement is attached to the hitch and the hitch is mounted at the rear of a tractor having pneumatic tires. A single quadrant lever, located in the tractor cab, is manually moved by the operator to generate position/draft commands which cause raising or lowering of the hitch. Draft sensors sense the draft on the hitch and a position sensor senses the position of the hitch, the sensors producing feedback signals to the microprocessor. The microprocessor responds to the position/draft commands and the feedback signals from the sensors by generating output signals for adjusting the hitch to the position commanded by the quadrant lever. The microprocessor output signals are applied to a solenoid of a closed-center valve, the valve in turn controlling hydraulic flow applied to a lift-cylinder which raises the hitch.

While systems of the type described by Macqueene et al. work quite well, uncommanded movement of the hitch may occur if a valve solenoid is energized through use of a low side driver. That is, if one end of the solenoid is connected to a positive voltage and the solenoid is energized by selectively connecting the other end of the solenoid to ground through a switch (driver) any inadvertent grounding of the wire lead connecting the switch to the solenoid or driver failure in an "on" state causes the solenoid to be energized. This, in turn, causes uncommanded movement of the hitch.

If the system is operating in a closed-loop mode, the feedback signals resulting from the uncommanded movement act through the feedback loop so that the hitch position commanded by the quadrant lever is maintained. However, the closed-loop mode may be aborted so that the operator may use fender mounted switches to control raising or lowering the hitch in an open-loop mode thereby facilitating attachment or removal of an implement from the hitch. Also, at start-up the hitch may not be under closed-loop control because the hitch is not "captured", i.e. at the position commanded by the quadrant lever. If the lead between the valve solenoid and its driver switch should be shorted to ground while the system is in an open-loop mode, uncommanded movement of the hitch will take place. Such movement, of course, could be dangerous.

SUMMARY OF THE INVENTION

An object of this invention is to provide a method and apparatus for preventing uncommanded hitch movement and more particularly uncommanded hitch movement during intervals when hitch movement is not under closed-loop control.

Another object of the invention is to provide a method and apparatus for preventing uncommanded downward hitch movement when the hitch is not captured, during transport, or when the hitch control system is in an external mode which permits control of hitch movement by manual switches.

The above-stated objects are accomplished by providing a safety disconnect relay having a contact connected between the hitch valve solenoid and the positive voltage source which powers the solenoid. A microprocessor senses for various conditions under which uncommanded hitch motion should be prevented, and controls the safety disconnect relay to disconnect the valve solenoids from the positive voltage when the conditions are found to exist.

DETAILED DESCRIPTION OF THE INVENTION

Figure 1:
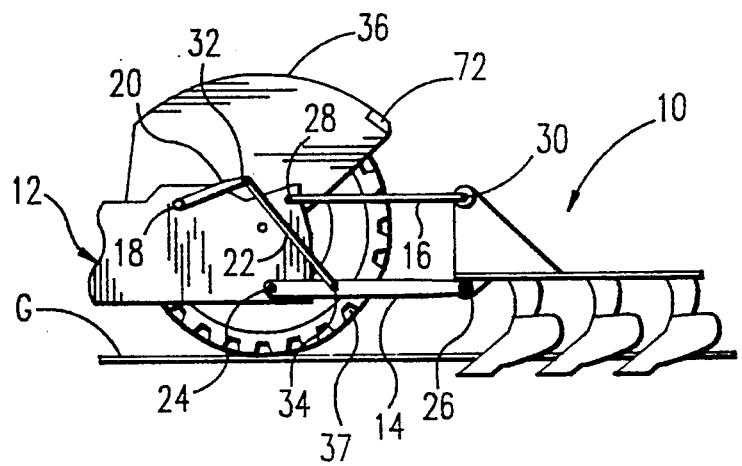
FIG. 1 illustrates a tractor-mounted hitch having a tillage implement attached thereto.

FIG. 1 illustrates a three-point hitch connecting a moldboard plow or other tillage implement 10 to the rear of a tractor 12. The hitch comprises left and right lower links 14 (FIG. 2), an upper link 16, a rockshaft 18 having crank arms 20 affixed thereto, and left and right adjustable links 22.

The lower links 14 are pivotally attached at one end by pins 24 to a frame member of the tractor, and at the other end links 14 are pivotally attached to the implement 10 by pins 26. Upper link 16 is pivotally attached to a frame member of the tractor by a pin 28, and pivotally attached to implement 10 by a pin 30. Each adjustable link 22 is connected at one end by a pivot pin 32 to a crank arm 20 and connected at the other end by a pivot pin 34 to an intermediate position of a lower link 14.

The position of implement 10 relative to ground G is adjusted by rotating rockshaft 18 through an arc. In FIG. 1, as the rockshaft 18 is rotated counter-clockwise, crank arms 20 act through adjustable links 22 to pivot lower links 14 counter-clockwise about pins 24. As link pins 26 are raised, the upper link 16 prevents the weight of the implement from pivoting the implement downwardly about pins 26, and the upper portion of the implement pivots in an arc whose center is located at pin 28.

Figure 2:
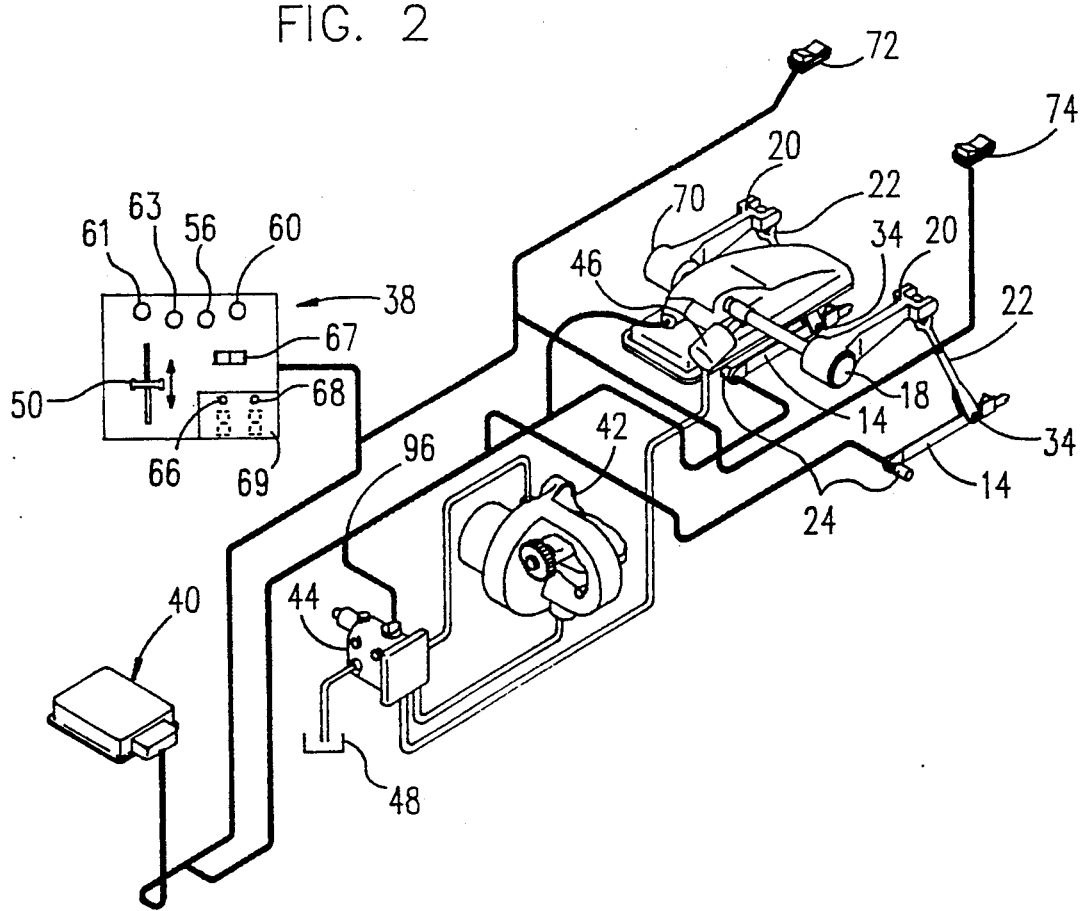
FIG. 2 is a schematic view of a three point hitch and an automatic draft control therefor.

FIG. 2 schematically illustrates an automatic draft control system for controlling the movements of the hitch by controlling movement of the rockshaft 18. The control system includes an electronic draft control (EDC) console 38, a microprocessor 40, a pump 42, an electro-hydraulic proportional control valve 44, and a hydraulic lift cylinder 46.

Figure 3:
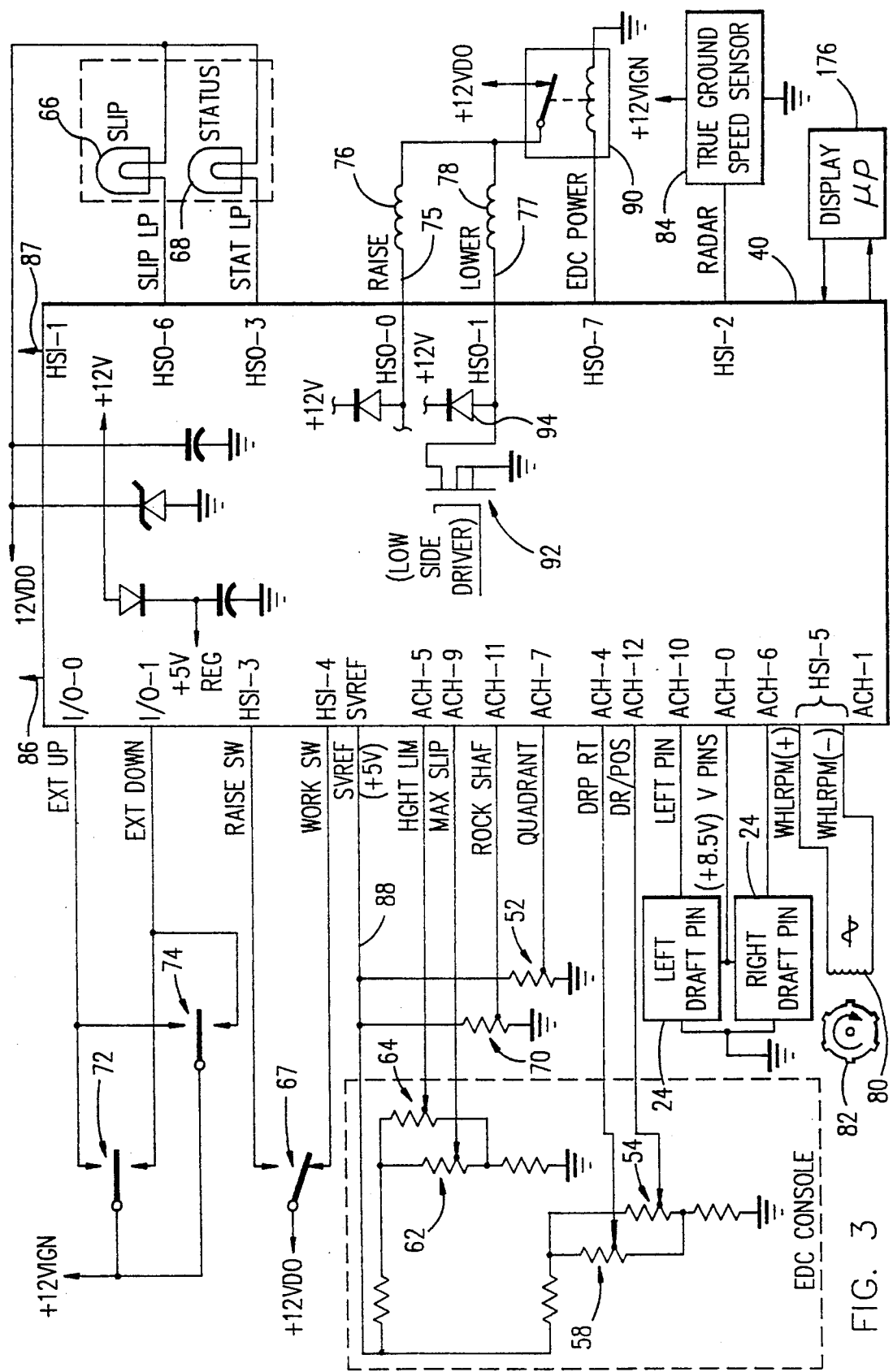
FIG. 3 illustrates the control microprocessor and inputs and outputs therefor.

The control console 38 has a hitch lift control or quadrant lever 50 which is pivoted near its lower end. As the lever 50 is moved forwardly or backwardly it actuates a potentiometer 52 (FIG. 3). The quadrant lever is used to control the positioning of the hitch. A stop (not shown) is provided for limiting forward movement of the quadrant lever 50. When the quadrant lever is moved forwardly beyond the stop, it places the control system in an open-loop or external mode which permits use of external fender switches to control positioning of the hitch.

The console also includes a position/draft mix control potentiometer 54 (FIG. 3) operated by a control knob 56 and a drop rate control potentiometer 58 operated by a control knob 60. The purpose of the control potentiometers 54 and 58 is explained below.

A digital display 69 is provided on the console to indicate the relative hitch position. In addition, the EDC console also includes a slip control knob 61 for controlling a maximum slip limit potentiometer 62, a height limit control knob 63 for controlling a height limit potentiometer 64, a slip indicator lamp 66 and an EDC status lamp 68. A work/raise rocker switch 67 is also provided on the console. This switch enables the operator to selectively raise the hitch to the height limit set by control knob 63, or lower the hitch to the position specified by the quadrant lever 50, by merely actuating the switch.

As subsequently explained, the hitch height may be controlled by a variable mix of position and draft signals. This requires that the position of the hitch and the draft be known. Therefore, a rotary potentiometer 70, driven by rockshaft 18, is provided to sense the position of the hitch. The pivot pins 24 are load sensitive pins such as those available from the Robert Bosch company and provide a means for sensing the draft. These pins provide an electrical output signal directly related to the horizontal component of the forces on the lower links 14.

To provide for manual control of the hitch position when attaching or detaching an implement 10, two three-position rocker switches 72 and 74 are mounted on the left and right fenders 36 covering the rear tractor wheels 37. Switches 72 and 74 are rendered operable by first moving the quadrant lever 50 forwardly past the stop position to initiate an external mode of operation. While the system is in the external mode, either switch 72 or 74 may be manipulated to raise or lower the hitch. The external mode, once initiated, remains in effect until the hitch is "recaptured" i.e. the quadrant lever 50 is moved to a position which corresponds (within limits) to the present hitch position.

Generally speaking, microprocessor 40 repeatedly samples the output signals from the various sensors, switches and potentiometers, and produces a pulse width modulated signal for controlling a "raise" solenoid 76 or a "lower" solenoid 78 (FIG. 3) associated with the closed center valve 44. To raise the hitch, fluid pressurized by pump 42 is passed through the valve to extend lift cylinder 46 which rotates rockshaft 18 counter-clockwise. To lower the hitch, the "lower" solenoid is energized to dump fluid from the lift cylinder 46 through valve 44 to sump 48. The hitch falls under its own weight and rotates the rockshaft 18 clockwise to retract the lift cylinder.

Referring now to FIG. 3, the microprocessor 40 may be an EEC-IV module of the type used by Ford Motor Company for automotive engine control. The microprocessor module comprises a type 8061 microprocessor with a 32K byte EPROM and a 16×16 bit $E^2$-PROM. The module also includes a plurality of analog input channels with A/D conversion means for converting the analog input signals to digital signals for use in the microprocessor. The outputs of potentiometers 52, 54, 58, 62, 64 and 70 and the draft sensor pins 24 are connected to the analog input channels. The fender switches 72 and 74 and the raise/work switch 67 are connected to digital inputs of the microprocessor.

The microprocessor 40 has a frequency input which is connected to a magnetic sensor 80. This sensor senses teeth on a gear 82 which rotates with the rear wheel axle of the tractor. The sensor produces an output signal at a frequency proportional to the rate of rotation of the axle. This signal is calibrated under zero wheel slip conditions as described in copending application B so that it may be used as a representation of wheel speed regardless of the effective rolling radius of the wheels. A doppler radar unit 84 is mounted on one side of the tractor and directed toward the ground forwardly of the unit. The radar unit senses true ground speed and applies to the microprocessor signals representing this speed. The wheel (axle) speed sensor and radar output signals are analyzed by the microprocessor to determine the degree of tractor wheel slip.

Power for the microprocessor and EDC control system is derived from the battery of tractor 12. Battery power is continuously applied to microprocessor 40 over lead 86 to power a keep-alive memory in the microprocessor. This memory enables stored data and status information to be retained when the tractor ignition switch (not shown) is off. A voltage +12VIGN is derived from the battery through the ignition switch. The battery also provides a voltage +12VDO through a relay circuit that does not drop out until 8 seconds after the ignition key switch is turned off. This latter voltage is applied to a voltage regulator circuit within the microprocessor 40 to generate a regulated voltage of +5. This voltage is applied to logic circuits within the microprocessor. In addition, the +5 volt signal is applied over a lead 88 to the potentiometers 52, 54, 58, 62, 64 and 70. A lead 87 is connected to the ignition switch and provides a signal to the microprocessor when the switch is closed.

Insofar as the automatic draft control is concerned, the microprocessor has only five outputs. Two of these outputs are for energizing the slip lamp 66 which is energized when the degree of wheel slip exceeds the limit as set by operator adjustment of potentiometer 62 and a status lamp 68 which indicates if the automatic draft control is active or inactive. Two additional outputs are provided for energizing the raise solenoid 76 and lower solenoid 78 associated with the lift control valve 44. The last output energizes the coil of a safety disconnect relay 90 having a normally closed contact connected between +12VDO and the raise and lower solenoids 76 and 78.

As shown in FIG. 3, the other side of the lower solenoid 78 is connected through a low side driver 92 to ground, and through a diode 94 to +12 V. The raise solenoid 76 is similarly connected to a further low side driver (not shown). Normally, the relay 90 is not energized so that +12 V is applied through its normally closed contacts to the solenoids 76 and 78. When the hitch is to be lowered, the microprocessor produces a pulse width modulated signal that turns on the driver 92 thus establishing a circuit from +12 V through the solenoid 78 and the driver to ground. The solenoid 78 controls valve 44 so that hydraulic pressure to the lift cylinder 46 is reduced and the hitch drops because of its own weight and the weight of the implement 10. To raise the hitch, the driver for solenoid 76 is turned on to energize the solenoid. The solenoid operates the valve so that fluid under pressure is applied to the lift cylinder from the pump 42.

From FIG. 2, it is evident that the leads 75 and 77 between the microprocessor 40 and the raise and lower solenoids 76 and 78 associated with valve 44 extend from some length through a wiring harness 96. Furthermore, it is evident from FIG. 3 that if the lead 77 should be shorted to ground, the lower solenoid 78 would be energized in the same manner as if the low side driver 92 were turned on. A similar situation exists for the raise solenoid 76 if lead 75 is shorted. As subsequently explained, relay 90 is provided to disable valve 44 and thus inhibit uncommanded downward movement of the hitch as a result of such shorts.

The microprocessor 40 may have additional inputs and outputs permitting it to control the tractor transmission and a tractor performance monitor but these are not shown in FIG. 3 since they are not necessary for an understanding of the present invention.

Figure 4A:
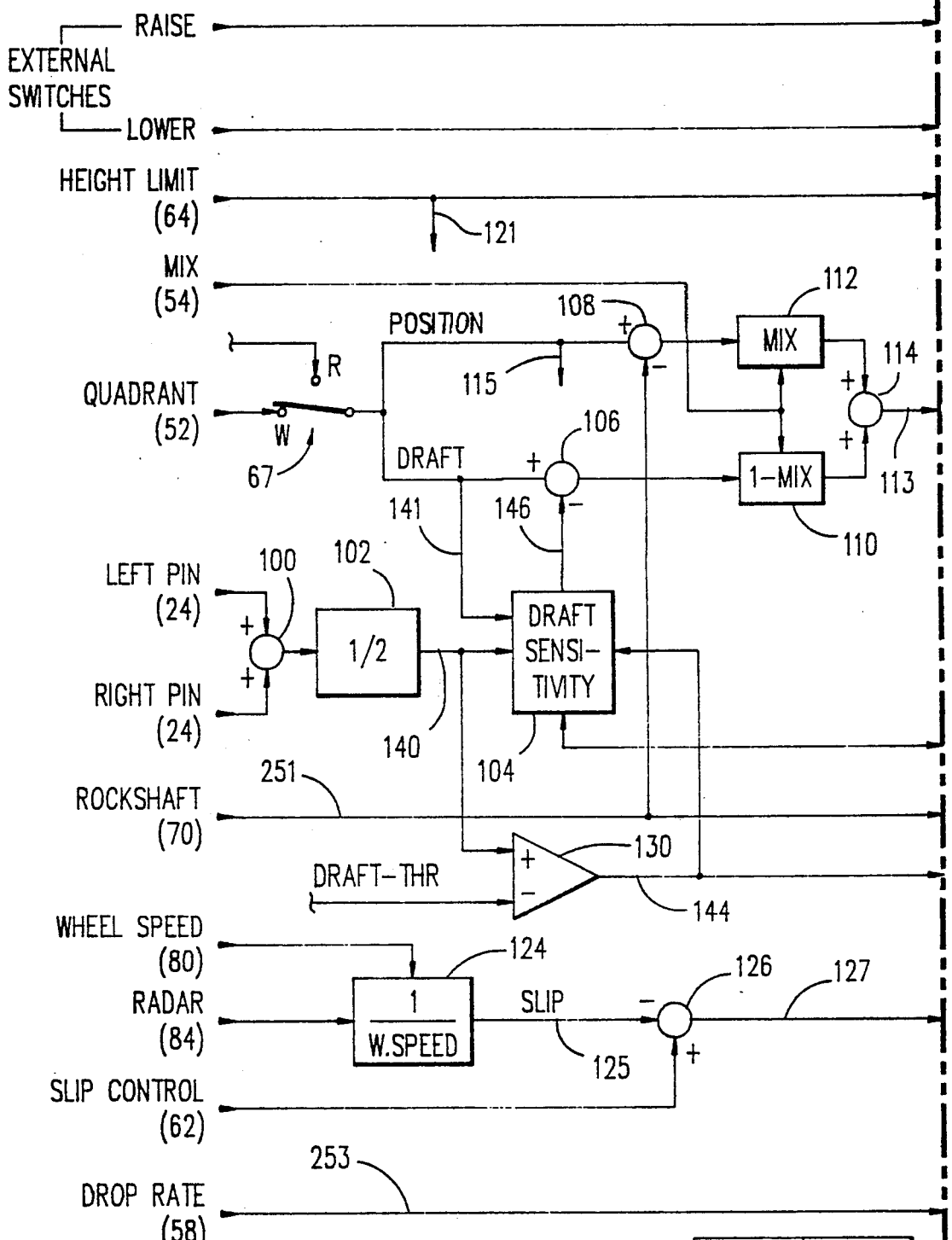
FIGS. 4A and 4B, when arranged as shown in FIG. 4 comprise a schematic diagram illustrating logic used in the automatic draft control; and, FIGS. 5A and 5B, when arranged as shown in FIG. 5, comprise a flow diagram illustrating logic for disabling the hitch upon detection of uncommanded hitch movement.
Figure 4:
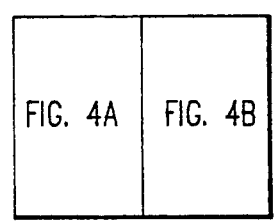
Figure 4B:
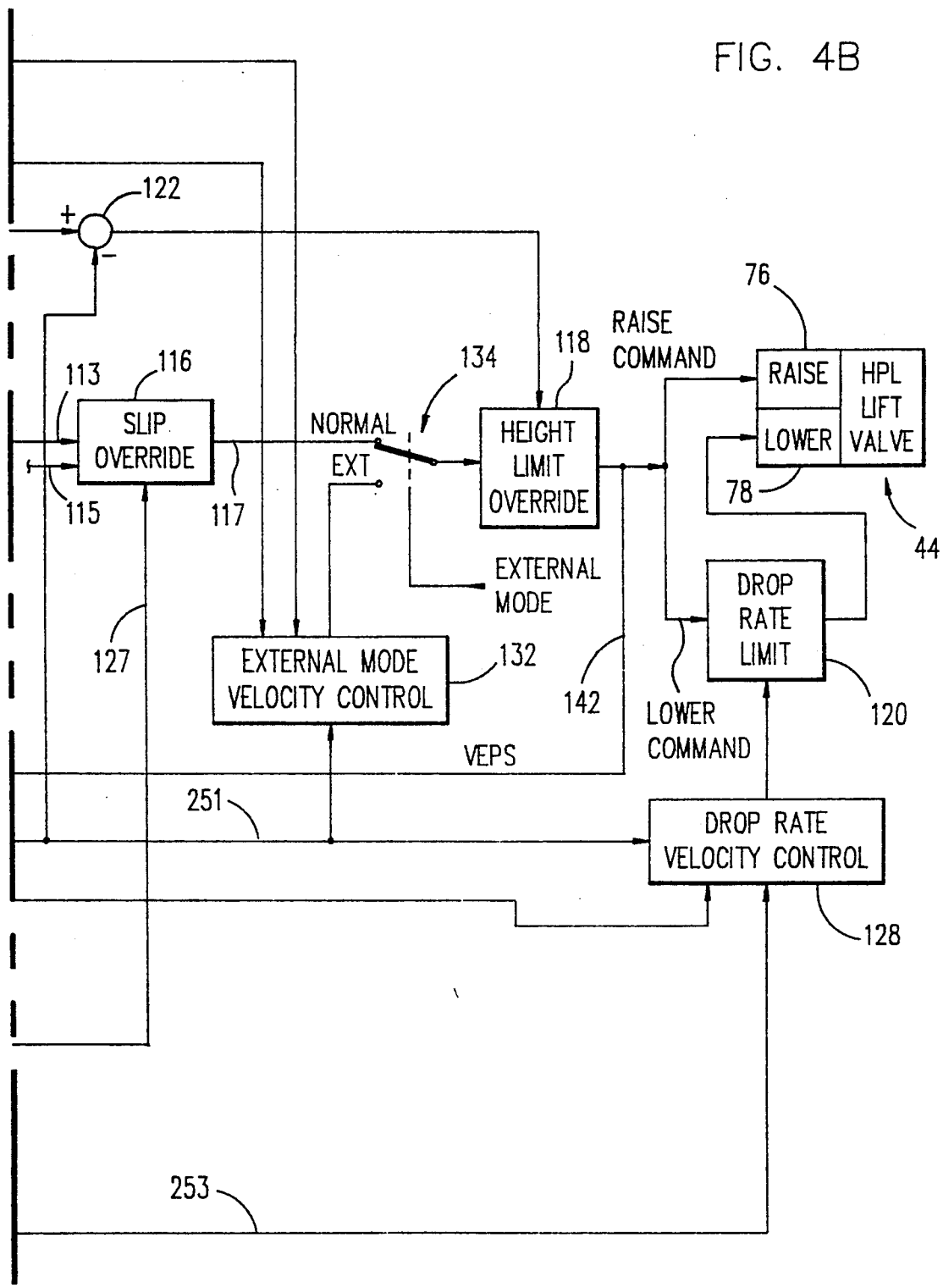

FIG. 4 is a schematic circuit diagram illustrating the logical sequence of operations performed by the program which controls microprocessor 40. These operations need not be performed by a programmed microprocessor but could also be performed by a combination of discrete analog or digital hardware circuits. To simplify the following explanation, the elements of FIG. 4 will be referred to as though they are discrete hardware circuits but it should be understood that in a preferred embodiment the various operations are carried out by circuits within microprocessor 40 as the microprocessor executes a sequence of program instructions.

Most of the input control signals for the automatic draft control are shown at the left of FIG. 4. These signals have been derived by sensing the various potentiometers, sensors and switches and, where appropriate, digitizing the analog signals and then digitally filtering them. Furthermore, the signals may have been subjected to a scaling function prior to the time they appear as input signals in FIG. 4. These operations are conventional and thus are not shown.

After the signals from the right and left draft sensor pins 24 are digitized, compensation made for the static weight of the hitch, and low pass filtered to eliminate frequencies above about 3.2 Hz, they are added together by an adder 100 and the sum divided by 2 by a divider 102 to obtain an average composite draft feedback signal COMPDRFT_I which is applied to a draft sensitivity control 104 over a path 140. As described in copending application A, the draft sensitivity control 104 either applies the signal COMPDRFT_I directly to a subtractor 106, or low pass filters the signal before applying it to the subtractor so that frequencies above 0.5 Hz are filtered out. The purpose of the draft sensitivity control is to reduce tractor vibrations which would otherwise occur as the hitch moves in response to a change in the position of quadrant lever 50.

The quadrant lever 50 (FIG. 2) provides single-lever control of both a hitch position command and a draft command. The signal derived from the quadrant lever potentiometer 52 is applied to a contact of the raise/work switch 67 and if the switch is set to the "work" position a digitized signal (Q_EFF) is applied to the draft sensitivity control 104 over a path 141. Q_EFF is also subjected to two different shaping functions (not illustrated) to derive a draft command which is applied to a subtractor 106 and a position command which is applied to both the subtractor 108 and a wheel slip override circuit 116. The digitized output of the rockshaft potentiometer 70 is also applied to the subtractor 108 so that the subtractor produces an output proportional to the difference between the hitch position as commanded by the quadrant lever 50 and the actual hitch position as sensed by the rockshaft potentiometer 70. In like manner, the output of subtractor 106 represents the difference between the draft as commanded by the quadrant lever 50 and the actual draft as sensed by the draft sensor pins 24.

The difference values obtained by subtractors 106 and 108 are fed to two mix determining circuits 110 and 112, respectively, where the output of subtractor 108 is multiplied by a mix factor determined by the setting of mix potentiometer 54. The output of the mix potentiometer is scaled to represent a value in the range of 0.3 to 1.0. The output of the subtractor 106 is multiplied by one minus the mix factor. The resulting values obtained at 110 and 112 are then summed by an adder 114.

The value derived by adder 114 may be subjected to slip override modification at 116 or height limit override modification at 118 before it is utilized to generate a pulse width modulated signal for application to the raise or lower solenoid 76 or 78 associated with the lift valve 44. In addition, if the output at 118 calls for lowering the hitch, the "lower" command may be further modified at 120 to limit the rate at which the hitch is lowered.

Since operation of the lift valve 44 changes the position of the hitch relative to the ground, and thus the position of the rockshaft, and the depth to which the implement penetrates the ground affects the signals generated by draft sensor pins 24, it is seen that FIG. 4 illustrates two inter-dependent closed-loops, a position feedback loop and a draft feedback loop, with the input control for both loops being derived from the quadrant lever 50 and the control signals being weighted by the setting of the mix potentiometer 54. The above-referenced SAE Technical Paper No. 901561 describes a draft/position feedback loop of this type.

The height limit potentiometer 64 enables the operator to manually select the maximum height to which the hitch may be raised. A subtractor 122 subtracts the signal derived from the rockshaft potentiometer 70 from the signal derived from potentiometer 64. As the hitch approaches the selected height limit the raise command at the output of circuit 118 is forced to zero.

The slip override circuit 116 is controlled by the outputs of radar unit 84, wheel speed sensor 80, the draft command from the quadrant lever, and the slip control potentiometer 62. The radar unit measures true ground speed (TGS) while the sensor 80 measures nominal wheel speed. After correction of the nominal wheel speed value as subsequently described, the true ground speed is divided by the wheel speed (W_SPEED) at 124 to compute the degree of wheel slip. The slip value is compared at 126 with a maximum permissible slip value set by the operator on slip control potentiometer 62. When actual slippage exceeds the selected maximum, a signal is produced on path 127 which modifies the value in the main control loop so that the hitch is raised. This lifts the implement 10 relative to the ground so as to place a smaller load on the tractor, and this in turn reduces wheel slip.

The purpose of the drop rate velocity control circuit 128 is to limit the rate at which the hitch is lowered. This rate may be manually selected by the operator by adjusting the drop rate potentiometer 58. Circuit 128 continuously adjusts the valve "lower" command at 120 to maintain a desired hitch velocity. The operation of the drop rate velocity control circuit is explained in copending application D. The drop rate velocity control function is inhibited when the implement is in the ground so that the hitch may respond quickly and properly to the draft correction signal derived at 118. The compensated draft signal derived at 102 is applied over path 140 to a comparator 130 where it is compared with a threshold value. When the draft signal exceeds the draft threshold value (the implement is in contact with the ground) the comparator produces a signal on path 144 to inhibit drop rate velocity control circuit 128.

The external mode velocity control circuit 132 is responsive to output signals from the external fender switches 72, 74 for controlling the raising or lowering of the hitch under operator control at a constant velocity. This facilitates connection or separation of implements from the hitch. As explained in copending application D, circuit 132 regulates hitch movement according to an integral velocity control algorithm which provides consistent, slow and safe operation. The command issued to valve 44 is limited to maintain a constant rate of lift movement thereby compensating for variations in implement weight, system temperature, pilot pressure and valve performance.

The external mode velocity control circuit 132 is enabled only by moving the quadrant lever 50 forward beyond a stop position so as to generate the External Mode command. In FIG. 4, this operation is equivalent to a switch as illustrated at 134. When the system is in the External Mode, the feedback control loop is open and the output of the circuit 132 is applied to the height limit override circuit 118. Normal closed-loop operation is restored by capturing the hitch by moving the quadrant lever 50 away from the "external mode" stop position to generate a position command corresponding to the current position of the hitch.

Figure 5B:
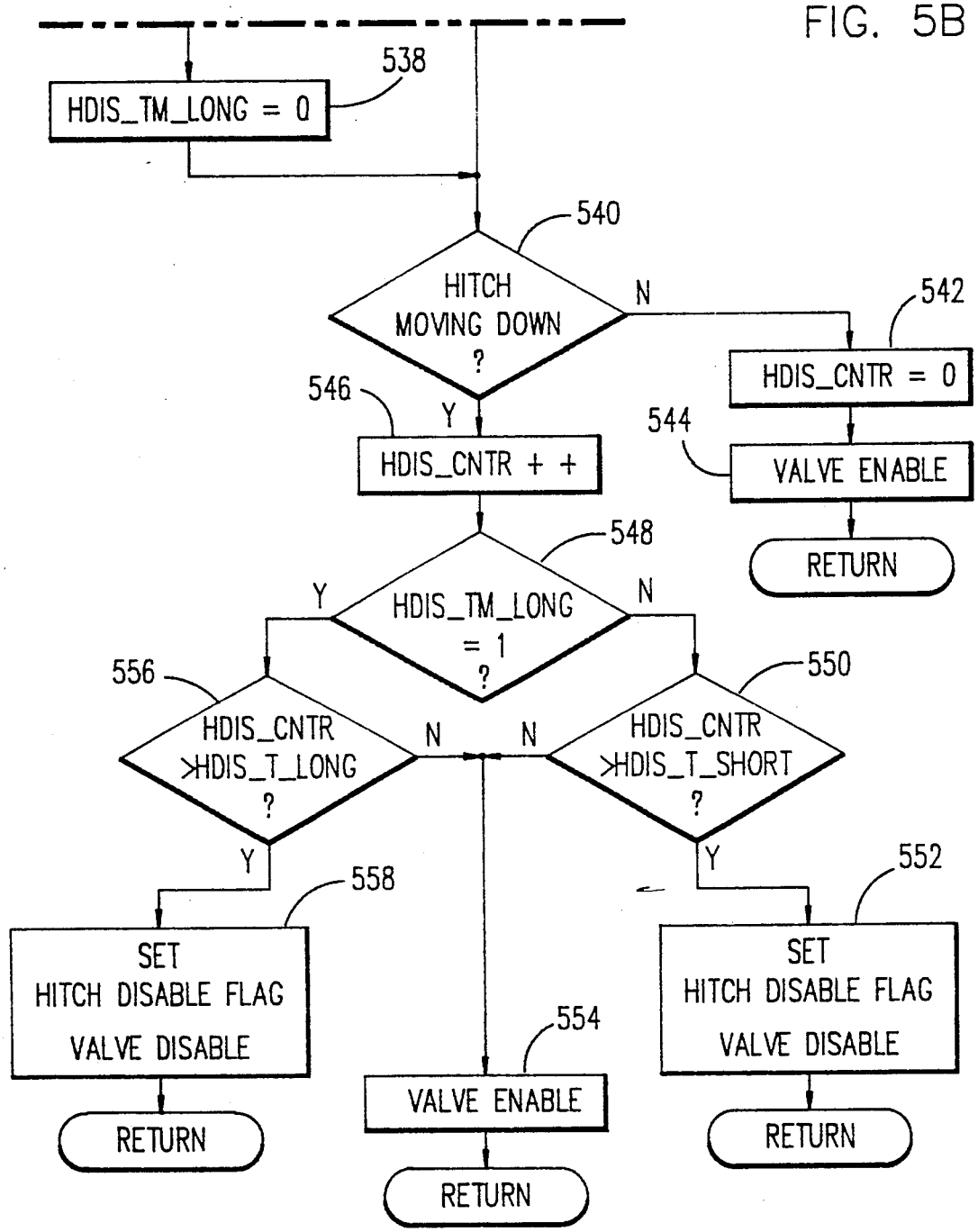

The safety disconnect relay 90 is provided to disable operation of the hitch valve 44 and thereby prevent uncommanded downward movement of the hitch when the system is not in its normal closed-loop mode. This may either be at start-up when the hitch is not captured, or when the external mode is selected so that the fender switches 72 and 74 may be used. FIGS. 5A and 5B comprise a flow diagram of a routine executed by microprocessor 40 to control the relay 90 and thereby prevent hitch movement.

The routine is periodically executed as part of the overall microprocessor program when the program branches to step 500. At this point a Hitch Disable flag is tested. This flag is normally reset but is set to permanently disable the hitch. Once the flag is set it may be reset only by turning the tractor ignition key off and then on. If the test at step 500 shows that the Hitch Disable flag is set, the routine moves to step 502 where the hitch valve 44 is disabled, that is, relay 90 is energized to remove power from relays 76 and 78 thereby preventing operation of the valve. The routine then returns to the main program routine.

If the test at step 500 proves false, then a Hitch Captured flag is tested at step 504. This flag is set when the hitch is captured and reset when the quadrant lever 50 is moved forwardly of the stop position so as to initiate the External Mode. The flag is also reset on start-up if the hitch position as sensed by rockshaft potentiometer 70 is not the same (within limits) as the position commanded by the position of the quadrant lever 50.

If the hitch is captured, the test at step 504 proves true and the routine tests the External Mode flag at step 506. This flag is set when the quadrant lever 50 is moved forwardly of its stop position. If the hitch is captured and the External Mode flag is not set it means that the hitch is operating under normal closed-loop control. Any uncommanded hitch motion occurring under these conditions will be automatically corrected by the closed-loop control selectively energizing the raise and lower valve solenoids 76 and 78. Therefore, after setting a flag HDIS_TM_LONG and clearing two counters (HDIS_CNTR and HSTILL_CNTR) at step 508, the microprocessor deenergizes relay 90 at step 510 so as to apply voltage to solenoids 76 and 78 and thus enable the valve 44. It will be understood that this merely enables the valve solenoids, the solenoids actually being energized by the closed-loop position error signal produced by the height limit override circuit 118. After relay 90 is deenergized, the routine returns to the main program.

If the test at step 504 proves false, or if the tests at steps 504 and 506 both prove true, step 512 senses the output of wheel speed sensor 80 to determine if the tractor is moving. If it is, the hitch valve is disabled at step 514. Because the operator can't control the hitch without capturing it and can't use the external switches 72, 74 when the tractor is moving, this is a safety precaution which is transparent to the operator.

After the valve is disabled, the flag HDIS_TM_LONG is set and the counters HDIS_CNTR and HSTILL_CNTR are reset at step 516 before the routine returns to the main program.

Briefly, the routine looks for uncommanded hitch movement if the test at step 512 proves false. Uncommanded movement is defined as downward movement of the hitch which is not being commanded by actuation of one of the fender switches 72, 74 to the "down" position. Because of the system dynamics and the response times of the mechanical elements, the routine does not respond to an uncommanded movement unless that movement persists for a predetermined period of time. A counter HDIS_CNTR is used to measure the time period. When uncommanded motion occurs, the counter is incremented at step 546 (FIG. 5B) each time the routine of FIGS. 5A and 5B is executed.

The predetermined time period during which uncommanded hitch movement must persist before the hitch valve is disabled may have one of two values HDIS_T_SHORT and HDIS_T_LONG. When the hitch is moving, dynamic effects of the system are more likely to cause false triggering of the valve disable logic. Therefore, in this instance the count in counter HDIS- _CNTR is compared with the larger value HDIS_T_LONG (step 556) to determine when the uncommanded hitch motion signal has persisted long enough to require that the hitch value be disabled.

On the other hand, when the hitch has been still (not moving) for at least a given interval of time before the detected motion began, it is unlikely that dynamic effects are causing false triggering of the valve disable logic. Therefore, to obtain a fast response for stopping uncommanded hitch motion the contents of counter HDIS_CNTR are compared (step 550) with the value HDIS_T_SHORT to determine if the hitch motion should be stopped.

A counter HSTILL_CNTR measures intervals during which the hitch is not moving. This counter is incremented at step 534 and when it reaches a threshold interval HSTILL_THR (step 536) it resets to zero a flag HDIS_TM_LONG (step 538). This flag is used to define whether the counter HDIS_CNTR is to be compared with the short interval value HDIS_T_SHORT or the long interval value HDIS_T_LONG. When the flag HDIS_TM_LONG is reset (0) the short interval value is used and when it is set (1) the long value is used.

At step 518, a test is made to see if either of the fender switches 72, 74 is actuated. If one of the switches is actuated the flag HDIS_TM_LONG is set and the counter HSTILL_CNTR is reset at step 520. At step 522 the switches are tested to see if either one commands downward hitch motion. If downward motion is commanded the hitch valve should be enabled, that is, relay 90 de-energized. HDIS_CNTR is reset at step 524 and the valve enabled at step 526 before the routine returns to the main program routine.

If neither fender switch is in the "down" position, the routine moves from step 522 to step 540 (FIG. 5B) where the output of the rockshaft potentiometer 70 is differentiated and tested to see if the hitch is moving down. If the hitch is not moving down, the counter HDIS_CNTR is reset at step 542 and the hitch valve is enabled at step 544 before the routine returns to the main program.

If the test at 518 shows that neither of the external fender switches 72, 74 is actuated, the routine differentiates the output of rockshaft potentiometer 70 at step 528 to see if the hitch is moving. Assuming for the moment that the hitch is not moving, the routine moves to step 532.

The purpose of steps 532, 534, 536 and 538 is to control incrementing of the hitch still counter HSTILL_CNTR and the resetting of the flag HDIS_T_M_LONG to zero when the hitch has not moved for an interval of time defined by the constant HSTILL_THR. Later, when step 548 is executed, the state of HDIS_TM_LONG determines whether HDIS_T_LONG or HDIS_T_SHORT will be used for determining if an uncommanded hitch movement has persisted long enough to be acted on.

Assume for purposes of illustration that HDIS_T_M_LONG=1 when step 532 is executed. The routine increments HSTILL_CNTR at step 534 and at step 536 HSTILL_CNTR is compared with HSTILL_THR. Assuming HSTILL_CNTR is less than HSTILL_THR the routine branches to step 540 where a test is made to see if the hitch is moving downwardly. Assuming it is not, steps 542 and 544 are executed and the hitch valve is enabled as previously described.

As long as conditions remain unchanged, HSTLL_CNTR is incremented at step 534 each time the routine of FIGS. 5A and 5B is executed. Eventually HSTILL_CNTR is incremented until it is equal to HSTILL_THR and when this condition is detected at step 536, the flag HDIS_TM_LONG is reset at step 538 before the routine executes step 540. This means that if uncommanded downward hitch movement is later detected, then HDIS_T_SHORT is compared with the contents of HDIS_CNTR to see if the movement has persisted long enough to require that the hitch valve is disabled.

Returning now to step 528, if the test indicates that the hitch is moving, the movement is not a commanded movement. The routine resets HSTILL_CNTR at step 530 and moves to step 540 where a test is made to see if the rockshaft movement is in the downward direction. If the motion is upwardly, steps 542 and 544 are executed as previously described and the hitch valve is enabled.

It should be noted that although the movement detected at step 528 was not the result of a command from the external switches, the hitch valve is still enabled if the movement, as detected at step 540 is upward movement. The routine disables the hitch valve only upon detection of uncommanded downward hitch motion. Provision might also be made to inhibit uncommanded upward hitch movement. However, external mechanical action on the hitch, such as might occur during transport or when hitching or unhitching an implement, causes false triggering of the logic thus making it impractical to include uncommanded movement detection in the raise direction. Also, the single acting cylinder 46 would have to be replaced with a double acting cylinder.

If the test at step 540 indicates that the uncommanded motion is in the downward direction, HDIS_CNTR is incremented at step 546 and the flag HDIS_T_M_LONG is tested at step 548.

Assuming that HDIS_TM_LONG is set, indicating that the hitch was not motionless for at least the interval HSTILL_THR prior to detection of the present motion, the routine branches to step 556 where HDIS_CNTR is compared with HDIS_T_LONG to see if HDIS_CNTR is greater. On the other hand, if the test at step 548 shows that HDIS_TM_LONG is not set, indicating that prior to detection of the present motion the hitch was motionless for at least the interval HSTILL_THR, the routine moves to step 550 where HDIS_CNTR is compared with HDIS_T_SHORT.

If the test at step 556 (or 550) proves false, it means that the detected downward movement has not persisted long enough to be classified as a valid downward movement. The program thus moves to step 544 to enable the hitch valve before returning to the main routine.

The next time the routine of FIGS. 5A and 5B is executed, and assuming no changes in conditions, HDIS_CNTR is incremented and again compared with either HDIS_T_LONG or HDIS_T_SHORT depending on whether HDIS_TM_LONG is set or reset. These actions are repeated as long as conditions remain unchanged. Eventually, depending on the state of HDIS_TM_LONG at step 548, HDIS_CNTR will prove greater than HDIS_T_LONG at step 556 or greater than HDIS_T_SHORT at step 550. In the former case, the Hitch Disable flag is set and the hitch valve disabled at step 558 and in the latter case these same actions are performed at step 552.

Once the Hitch Disable flag is set and the hitch valve is disabled at step 552 or 558, the hitch valve is permanently disabled until the tractor ignition is switched off and then on. If the ignition is not switched off, each time the routine of FIG. 5A is entered, step 500 detects that the flag is set so the routine branches to step 502 to insure that the hitch movement valve is disabled and then returns to the main routine.

From the foregoing description it is seen that the present invention provides a simple and inexpensive method and apparatus for eliminating uncommanded downward hitch. While a specific preferred embodiment has been described by way of illustration, it will be understood that various modifications and substitutions may be made in the described embodiment without departing from the spirit and scope of the invention as defined in the appended claims. For example, the safety disconnect relay need not be an electromechanical relay but may be an electronic relay.

The invention in which an exclusive property or privilege is claimed is defined as follows.

We claim:

1. In a hitch control system having a valve for controlling movement of a hitch mounted on a vehicle and solenoid means connected in a series circuit with a switch means across a source of voltage, said switch means being selectively energized to energize said solenoid means by closing said series circuit, said hitch control system including circuit means operable in a closed-loop mode to control positioning of said hitch to a position specified by a position command and operable in an open-loop mode to control movement of said hitch in response to actuation of a manual switch, a method of preventing motion of said hitch in response to failure of a component in said system while said circuit means is operating in said open-loop mode, said method comprising:
providing a safety disconnect switch for selectively opening said series circuit;
determining if said hitch is captured;
determined if said circuit means is in said open-loop mode;
sensing for movement of said hitch;
sensing for actuation of a manual switch;
when hitch movement is detected and said manual switch is not actuated, controlling said safety disconnect switch to open said series circuit if said hitch is not captured; and,
when hitch movement is detected and said manual switch is not actuated, controlling said safety disconnect switch to open said series circuit if said circuit means is in the open-loop mode.

2. The method as claimed in claim 1 and further comprising:
sensing movement of said vehicle;
controlling said safety disconnect switch to open said series circuit when said vehicle is moving and said hitch is not captured; and,
controlling said safety disconnect switch to open said series circuit when said vehicle is moving and said circuit means is in said open-loop mode.

3. The method as claimed in claim 1 wherein said safety disconnect switch is controlled to open said series circuit only when the hitch movement detected is downward movement.

4. A method as claimed in claim 1 wherein said safety disconnect switch is controlled to open said series circuit only when the hitch movement detected persists for at least a threshold period of time.

5. A method as claimed in claim 1 wherein said safety disconnect switch is controlled to open said series circuit only after said hitch movement detected persists for at least a first threshold period of time after said hitch has been still for at least a fixed interval; and,
said safety disconnect switch is controlled to open said series circuit only after said hitch movement detected persists for at least a second threshold period of time greater than said first threshold period if said hitch has not been still for at least said fixed interval.

6. In a hitch control system having a valve for controlling movement of a hitch mounted on a vehicle and solenoid means connected in a series circuit with a switch means across a source of voltage, said switch means being selectively energized to energize said solenoid means by closing said series circuit, said hitch control system including circuit means operable in a closed-loop mode to control positioning of said hitch to a position specified by a position command and operable in an open-loop mode to control movement of said hitch in response to actuation of a manual switch, apparatus of preventing motion of said hitch in response to failure of a component in said system while said circuit means is operating in said open-loop mode, said apparatus comprising:
a safety disconnect switch for selectively opening said series circuit;
first means for determining if said hitch is captured;
second means for determining if said circuit means is in said open-loop mode;
third means for sensing for movement of said hitch;
fourth means for sensing for actuation of said manual switch; and,
fifth means responsive to said first, third and fourth means for controlling said safety disconnect switch to open said series circuit when hitch movement is detected and no manual switch is actuated if said hitch is not captured; and,
sixth means responsive to said second, third and fourth means for controlling said safety disconnect switch to open said series circuit when hitch movement is detected and no manual switch is actuated and said circuit means is in said open-loop mode.

7. The apparatus as claimed in claim 6 and further comprising:
seventh means for sensing movement of said vehicle, said fifth means being responsive to said seven means for controlling said safety disconnect switch to open said series circuit when said vehicle is moving and said hitch is not captured and said sixth means being responsive to said seventh means for controlling said safety disconnect switch to open said series circuit when said vehicle is moving and said circuit means is in said open-loop mode.

8. Apparatus as claimed in claim 6 wherein said fifth means includes means for controlling said safety disconnect switch to open said series circuit only when the hitch movement detected by said third means is downward movement.

9. Apparatus as claimed in claim 6 wherein said fifth means includes means for controlling said safety disconnect switch to open said series circuit only when the hitch movement detected by said third means persists for at least a threshold period of time.

10. Apparatus as claimed in claim 6 wherein said fifth means includes:
- a first counter for tolling intervals during which said hitch is still;
- means for setting an indicator to one of two states when a count in said first counter reaches a predetermined value;
- a second counter for tolling intervals during which uncommanded motion of said hitch persists;
- first and second comparator means comparing a count in said second counter with first and second threshold values, respectively, depending upon the state of said indicator.

11. In a hitch control system having a valve for controlling movement of a hitch mounted on a vehicle and solenoid means connected in a series circuit with a switch means across a source of voltage, said switch means being selectively energized to energize said solenoid means by closing said series circuit, said hitch control system including circuit means operable in a closed-loop mode to control positioning of said hitch to a position specified by a position command and operable in an open-loop mode to control movement of said hitch in response to actuation of a manual switch, a method of preventing motion of said hitch in response to failure of a component in said system during transport, said method comprising:
- providing a safety disconnect switch for selectively disconnecting said solenoid means from a positive side of said voltage source;
- determining if said hitch is captured;
- determining if said circuit means is in said open-loop mode;
- sensing for movement of said vehicle; and,
- when vehicle movement is detected, controlling said safety disconnect switch to open said series circuit if said hitch is not captured; and,
- when vehicle movement is detected, controlling said safety disconnect switch to open said series circuit if said circuit means is in said open-loop mode.

* * * * *